United States Patent

[11] 3,620,501

| [72] | Inventor | Morley V. Friedell<br>Wheetridge, Colo. |
|---|---|---|
| [21] | Appl. No. | 860,885 |
| [22] | Filed | Sept. 25, 1969 |
| [45] | Patented | Nov. 16, 1971 |
| [73] | Assignee | Martin Marietta Corporation<br>New York, N.Y.<br>Original application Aug. 27, 1965, Ser. No. 483,039, now Patent No. 3,478,775. Divided and this application Sept. 25, 1969, Ser. No. 860,885 |

[54] NONCHATTERING PRESSURE RELIEF VALVE
7 Claims, 5 Drawing Figs.

| [52] | U.S. Cl. | 251/333 |
|---|---|---|
| [51] | Int. Cl. | F16k 1/34 |
| [50] | Field of Search | 251/333, 124, 123, 121, 244, 245; 137/516.29; 123/117 |

[56] References Cited
UNITED STATES PATENTS

| 1,255,370 | 2/1918 | Wheaton | 251/245 X |
| 3,027,134 | 3/1962 | Nichols | 251/333 X |
| 3,097,666 | 7/1963 | Antrim et al. | 251/333 X |
| 3,252,451 | 5/1966 | Sarto | 123/117 |
| 3,332,437 | 7/1967 | Hallen | 137/516.29 |

FOREIGN PATENTS

| 1,248,029 | 10/1960 | France | 251/333 |
| 1,161,732 | 1/1964 | Germany | 251/124 |

Primary Examiner—M. Cary Nelson
Assistant Examiner—R. B. Rothman
Attorneys—Phillip L. De Arment and Gay Chin ABSTRACT: A reciprocating disclike poppet valve is provided with a frustoconical periphery for contact with a cylindrical valve seat which is inclined radially outwards in the direction of flow, the limited angle of inclination insuring that the area of pressure change between the valve and the seat does not increase sufficiently and the effective upstream pressure on the valve does not reduce appreciably from valve closed to valve fully open position to prevent valve chattering.

PATENTED NOV 16 1971
3,620,501
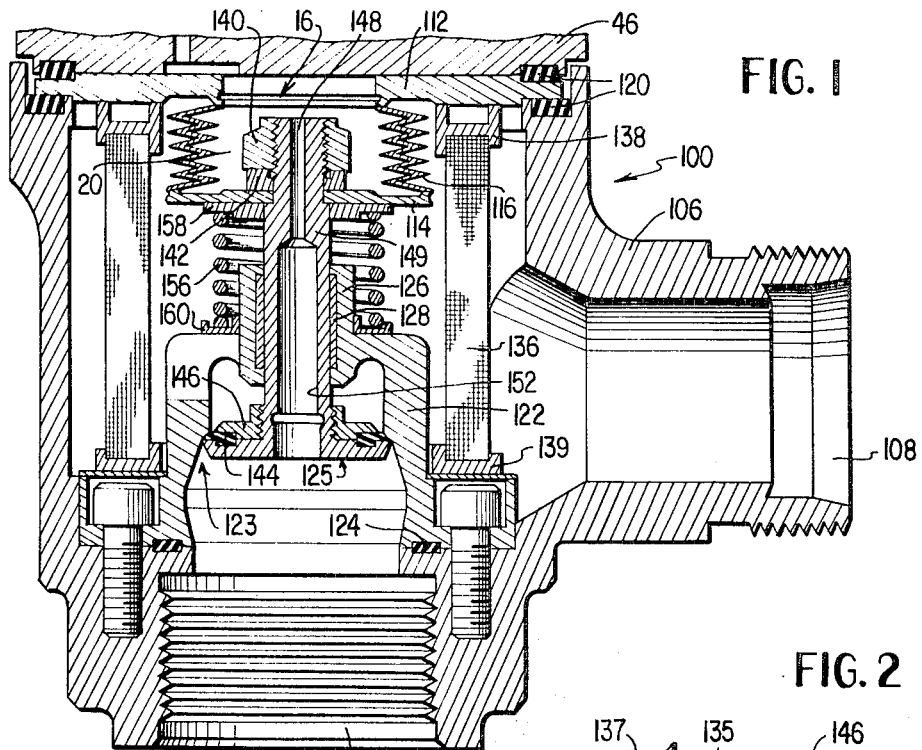
FIG. 1
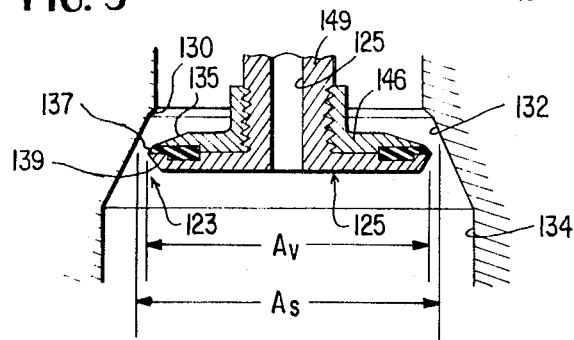
FIG. 3
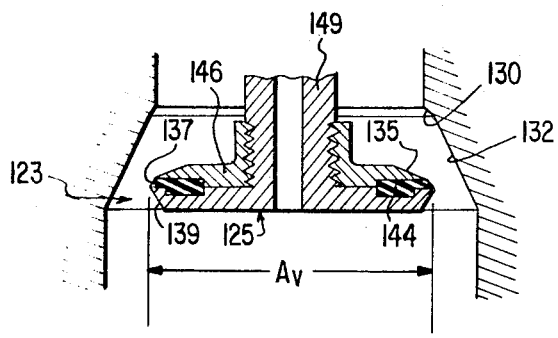
FIG. 4
FIG. 2
FIG. 5
INVENTOR
MORLEY V. FRIEDELL
BY Phillip L. DeArment
ATTORNEYS.

NONCHATTERING PRESSURE RELIEF VALVE

This application is a division of application Ser. No. 483,039, now U.S. Pat. No. 3,478,775, filed Aug. 27, 1965, entitled PRESSURE RELIEF VALVE and assigned to the common assignee.

BACKGROUND OF THE INVENTION

1. Field of the Invention

This invention relates to pressure relief valves, and more particularly to reciprocating poppet type valves characterized by a lack of chattering during self-induced opening as a result of upstream pressure rise above a predetermined limit.

2. Description of the Prior Art

Conventional reciprocating pressure relief valves of the poppet type employ a spring biased reciprocating valve of disc form which is spring biased into contact with a circular or annular valve seat in such a manner that upon increase in the pressure of the upstream fluid causes the valve to move off the valve seat against the spring bias, allowing the fluid to escape between the periphery of the valve and the valve seat and exit through the valve outlet. Valves of the usual design involve "an all or nothing" control and require considerable force to maintain control such as available only by the use of a large actuating ratio or area ratio. Consequently, although large area ratios are used to provide sufficient power to operate the main valve of the pressure regulator, the effect of using such large operating forces results in the valve opening too wide, followed by reactive excessive closing with the ultimate effect that an oscillation between opening and closing results, thereby producing instability and destructive valve chattering.

SUMMARY OF THE INVENTION

It has been found, however, that the problem of instability and slow response can be overcome with the use of a light weight, compact pressure relief valve incorporating a small actuating ratio or area ratio and a closable, variable venturi orifice. A variable venturi or orifice, as used herein, is a flow control device including valve means which maintains a choke flow therethrough while maintaining a relatively constant fluid force on the valve means.

In essence, the poppet-type, main valve comprises a disc having a periphery which is frustoconical in cross section and has line or surface contact with an annular valve seat whose surface is inclined radially outwards in the direction of flow with the angle of inclination being such that the effective upstream pressure on the valve does not reduce appreciably from the valve fully closed position to the valve fully opened position. The seat diameter therefore remains relatively fixed, the valve exposed to pressure is conical from its seating point inwardly toward the valve stem. No choke flow occurs above the seat to materially reduce the upstream pressure acting on the poppet, thereby causing immediate reclosing of the valve on the valve seat under the spring bias, resulting in valve chatter, characteristic of prior art valves.

The beneficial venturi configuration of a portion of the valve seat cooperates with the main valve and includes a first, relatively short, frustoconically shaped surface part, the extension of which forms an inclined angle with a longitudinal axis of the orifice means between approximately 30° and 60° and a second, frustoconically shaped surface part integral with the first surface part, the extension of which forms an included angle with the longitudinal axis of the orifice means between 15° and 25°.

BRIEF DESCRIPTION OF THE DRAWINGS

FIG. 1 is an elevational, cross-sectional view of a portion of a reciprocating, poppet type pressure relief valve incorporating the specially configured poppet valve and valve seat of the present invention.

FIG. 2 is an enlarged sectional view of a portion of the pressure relief valve of FIG. 1 with the poppet valve in fully closed position.

FIG. 3 is an enlarged cross-sectional view of a portion of the pressure relief valve of FIG. 1 with the valve in partially open position.

FIG. 4 is an enlarged cross-sectional view of a portion of the valve of FIG. 1 with the valve in fully opened position.

FIG. 5 is a sectional view of a typical prior art poppet type reciprocating pressure relief valve with the valve in partially open position.

DESCRIPTION OF THE PREFERRED EMBODIMENT

Referring to the drawings, FIG. 5 discloses a typical prior art reciprocating, poppet-type valve of the pressure relief type indicated generally at 10, wherein the fixed casing 12 carries a bore 14 defining a lip 16, with the bottom wall 18. The annular lip 16 acts as the valve seat. Bore 14 therefore forms the upstream flow channel for the valve. The disclike poppet valve 20 includes an integral stem 22 with the enlarged diameter valve disc carrying an annular recess 26 which receives a resilient annulus 28 forming the contact or seal surface between the valve 20 and the valve seat 16. A threaded flanged coupling member 30 maintains the annulus 20 within recess 26. Biasing means (not shown) bias the valve 20 in closed position on valve seat 16.

In this typical prior art arrangement, the seat diameter remains fixed during all positions of the valve and is approximately that of bore 14. When the valve 20 is closed, the maximum poppet area is exposed to the upstream pressure and is defined by the arrow $A'V1$. As the valve opens, the poppet is depressed and the effective diameter of the poppet valve adjacent to seat 16 decreases to that of arrow $A'v2$. This reduction in effective upstream surface area of the valve along with a reduction in pressure due to the velocity of the fluid flow escaping between the valve seat 16 and the tapered surface 32 of threaded member 30. Unless the pressure of the fluid flow in the upstream channel defined by bore 14 is appreciably increased, reclosure of the valve occurs. The force tending to keep the valve open is defined by the formula $F = M \times P$ wherein $F$ is the force tending to keep the valve open, $M$ is the effective area, and $P$ is the upstream pressure, where ($M$ is the diameter of the valve seat minus the diameter of the poppet at the seat over 2). This results in a decrease in the effective area of the upstream surface of the poppet valve reducing the fluid force tending to keep the valve open. When this force F reduces below the biasing force, naturally the poppet valve will reclose. If, in the illustration of FIG. 5, the valve opens to its fullest extent, the means effective area of the valve may be further reduced as indicated by the arrow $A'v3$ and assuming that the upstream pressure remains constant or does not rise appreciably, the force tending to keep the valve open may be insufficient to maintain the poppet valve open even though the upstream pressure is above the design valve pressure for immediate pressure relief. Thus, when the valve is closed, the maximum poppet area is exposed to the upstream fluid pressure. As the valve opens and the poppet is depressed, the diameter of the poppet adjacent to the seats decreases. This directly reduces the pressure effective area of the valve and the applied force due to the upstream pressure of the fluid. The difference in these two areas is the flow area as defined by arrow $\Delta P$ which occurs below the seat but above the upstream surface of valve 20. In the area $\Delta P$ between the seat 16 and surface 32 of the valve as shown, fluid expansion is occuring which results in a reduction in pressure. The upstream pressure cannot be maintained at the seat diameter on the poppet when the poppet is open to any degree. Reduction of fluid force, of course, immediately requires an additional actuating force to keep the valve open and since some time is required for the valve to respond, the valve closes before the additional actuating force can be applied. The valve starts an oscillating or chattering cycle with the seal 28 moving into contact and away from the valve seat 16 necessitating extreme dampening of the valve to slow down the action. However, this is detrimental to the sensitivity of the valve and also reduces the capability of the valve for high speed operation.

The problem of chattering is completely eliminated in the poppet type pressure relief valve of the present invention. The present invention is applicable particularly to poppet type pressure relief valves to prevent chattering of the same since they are inherently self-operating and close under a spring bias. However, the invention is equally applicable to reciprocating valves in general to reduce other side effects resulting from an abrupt change in effective surface area due to opening and closing of the valve. The pressure relief valve 100 comprises a body 106 including an inlet 108 and an outlet 110. A bellows assembly comprises an upper terminal 112, a lower movable terminal 114 and a bellows 116. The bellows 116 is welded to the terminals 112 and 114. The terminal 112 is clamped between the body 46 of the pilot valve and the body 106 of the main valve by any suitable means such as a plurality of bolts (not shown) and is sealed against leakage by a pair of gaskets 120. A valve cage 122 is secured in valve body 106 and sealed against leakage by a gasket 124. The valve cage 122 includes a guide bearing 126 and a low friction shoe bushing 128 and a portion of the variable venturi means 123 which cooperates with the main valve 125. Said portion comprises a first relatively short, conically shaped surface part or valve seat 130 interconnected with a second, conically shaped surface part 132. Said second conically shaped surface part 132 is of extended length and is interconnected with a cylindrical shaped surface area 134. Cylindrically shaped surface area 134 circumscribes an expanded flow area for normal operation of the main valve 125 when actuated by a solenoid (not shown), otherwise, the main valve 125 does not extend into the area circumscribed by the surface area 134 during operation of the pressure relief valve.

A protective cylinder 136 is interposed between terminal 112 and valve cage 122 and is provided with gasket seals 138 and 139, the main valve 125 is guided in bearing 126 and fastened to lower movable terminal 114 by means of a nut 140. A seal ring 142 is used to effect a leak type connection. At the opposite end, a seat seal 144 is keyed into a groove formed in the main valve 125 and is maintained therein by the threaded retainer 146. A control orifice 148 is formed in the stem 149 of the main poppet valve 125. The control orifice is disposed in communication with outlet 110 by passage 152. Passage 152 interconnects the chamber of the solenoid valve (not shown) and sensing chamber 16 of the pilot valve with the actuating chamber 20 which is circumscribed in part by bellows 116 and lower movable terminal 114. The lower movable terminal 114 is a pressure responsive member and is secured or attached to the main valve 125 by valve stem 149 for movement therewith. The lower movable terminal 114 and the attached main valve 125 are biased in an upward direction by spring 156 which is disposed between spring rest 158 and 160. The upper spring rest 158 is mounted beneath the lower movable terminal The operation of the pressure relief valve 100 and its structure is fully shown and described in the referred to application of which the present application is a division. Insofar as the operation is concerned, it is important to note that the fluid pressure within bellows chamber 16 acts on one side of movable terminal 114 of the bellows assembly while the biasing force of coil spring 156 and the fluid pressure at inlet 108 acts on the opposite surface of terminal 114. Thus, when the internal bellows chamber pressure surpasses the combined fluid pressure externally of the bellows assembly and the bias offered by coil spring 156, the main valve 125 will open allowing fluid to pass about the periphery of valve 130 from inlet 108 to outlet 110.

In designing the function of the main valve 125, it has been found that excellent modulation control is obtained by maintaining the dynamic flow forces substantially constant on the main valve 125 under substantially all flow conditions and by maintaining a flow that is substantially directly proportional to pressure change. In other words, a relatively constant fluid force must be maintained on the main valve 125 during all flow conditions and the mass flow should be proportional to the linear movement of the valve except when the main valve is actuated by the solenoid (not shown).

The foregoing is accomplished by using a main valve which has a narrow portion of a seat seal contacting the surface part 130 substantially at right angles. The surface part 130 is relatively short and conically shaped. An extension of the surface part 130 forms an included angle with the longitudinal axis of the orifice means between approximately 30° and 60° and preferably between approximately 40° and 50°, although excellent results have been obtained with an included angle of approximately 45°, i.e., 45° plus or minus 1°. The seat contact is very short in width, preferably less than 0.025 inch in width to provide the least possible change in seating area between a closed and open valve condition. The first surface part 130 interconnects and blends with the second surface part which is also conically shaped. An extension of the second surface part forms an included angle with the longitudinal axis of the orifice means between approximately 15° and 25° and preferably between 15° and 20°, although excellent results have been obtained with an included angle of approximately 18°, i.e., 18° plus or minus ½°.

The seat seal 144 engages the first surface part 130 with the lower portion thereof being disposed at the point where the first surface part 130 interconnects and blends with the second surface part 143, see FIG. 2. Consequently, when the main valve 125 cracks open, and moves about 0.005 inch, the flow restriction area is positioned at the periphery of seat seal 144. For the balance of the stroke, which in this application does not exceed about ¼ inch unless solenoid (not shown) is actuated, a flow restriction or choke flow occurs between the periphery of the seat seal 144 and the conically shaped area 132. At the maximum controlling extension of main valve 125, which is at the break between the conically shaped area 132 and the cylindrically shaped area 134 the area is designed to pass specified maximum weights of gas at the minimum specified pressure. As it will be readily apparent, in view of the foregoing, for any intermediate position of valve 125, the flow will be almost directly proportional to the extension of the valve.

As previously indicated, the pressure relief valve 100 must be capable of responding or operating in extremely rapid rates. It was found that the use of a small area ratio between the power or actuating chamber 16 and a low inertia main valve 125 combine to produce extremely fast main valve actuation rates.

With the linear characteristics of the pilot valve combined with the linear characteristics of the closing spring 156 and bellows 116, it will be apparent that the response of the valve is almost perfectly linear. Further, a valve constructed in accordance with this invention also eliminates unbalancing forces under various flows. Additionally, since the choke flow or maximum velocity change occurs at the periphery of the main valve 125, it will now be apparent that a relatively constant pressure force is maintained on the upstream side of the main valve 125 under substantially all flow conditions. Although there is a slight effective impact pressure under maximum flow conditions, this effect is almost evenly balanced by the back pressure on the opposite side of the valve.

Extensive tests conducted on the valve through the use of an oscilloscope disclosed that at extremely low flow rates (approximately 1 percent of design capacity), when the valve poppet has moved less than 0.005 inch off the seat, low-frequency relief burst (less than 0.2 p.s.i. differential pressure) can occur due to seat width being on the order of 0.35 inch causing slight oscillation of the poppet. Such motion involves movement of the poppet of less than 0.005 inch and is nondestructive to the valve. To this extent, the valve is considered "nonchattering," in the present invention.

Reference to FIGS. 3 and 4 illustrate graphically as the valve opens, the flow area existing between the periphery of the valve and a surface on the valve seat is maintained at the periphery of the valve 125 and the pressure affected area on the upstream side of valve 125 does not change. Thus, constant pressure is maintained on the valve to urge the valve open since the overall effective pressure area on the upstream side of the valve 125 does not reduce but remains constant. Of course, the difference between the seat area indicated by arrow $A_s$ in FIG. 3 and the effective valve area indicated by the arrow $A_r$ represents the flow area which increases proportionally from fully closed position in FIG. 2 through a medium position in FIG. 3 to a fully open position in FIG. 4 (in the absence of solenoid operation). All pressure change occurs outside the valve periphery providing a stable valve without the oscillation or chatter of prior designs such as that illustrated in FIG. 5. It is noted that the tapered surface 135 of retainer 146 and the tapered periphery 137 of the seat seal 144 act with the reverse shear surface 139 of the main valve 125 to form, in conjunction with the outwardly inclined or tapered annular surface 130 of the valve seat area, a variable venturi orifice or flow path for the fluid escaping from inlet 108 to outlet 110. In the extreme open position of FIG. 4, the periphery of the reciprocating valve 125 has not yet reached the full cylindrical surface area 134 which is at right angles to the axis of reciprocation.

What is claimed is:

1. A reciprocating valve comprising: an annular flow passage formed by a wall inclined outwardly in the direction of flow, a reciprocating valve disc movable into peripheral contact with said wall to effect closing thereof said inclined wall including an annular portion at an increased diverging angle in a downstream direction to define an upstream seal area, said peripheral edge of said disc being frustoconical in cross section and including a first inwardly inclined, annular upstream portion immediately adjacent the periphery corresponding to said annular seal portion of said wall and movable into contact therewith to effect surface sealing therebetween and a second inwardly inclined annular portion extending against the direction of flow beyond the valve seal area in valve closed position to create an effective venturi immediately upon opening of said valve.

2. The reciprocating valve as claimed in claim 1 wherein said annular portion cooperating with said valve disc is relatively short in axial length and the extension of which intersects the longitudinal axis of said reciprocating valve to form an included angle of approximately 30° to 60° and the downstream wall portion therefrom is such that the extension of said downstream wall portion intersects the longitudinal axis of said valve to form an included angle of approximately 15° to 25°.

3. A reciprocating valve comprising:

an annular flow passage formed by a wall inclined outwardly in the direction of flow and including a first surface portion cooperating with said valve disc which is relatively short in axial length and the extension of which intersects the longitudinal axis of said reciprocating valve to form an included angle of approximately 30° to 60° and a second surface portion interconnected with said first surface portion, the extension of said second surface portion intersecting the longitudinal axis of said valve to form an included angle of approximately 15° to 25°, and a reciprocating valve disc movable into peripheral contact with said wall to close the valve, the peripheral edge of said disc being frustoconical in cross section whereby, said edge and said inclined wall define a variable venturi flow orifice, said valve disc further including a peripheral seal portion defining the upper surface of said frustoconical peripheral edge, with said disc being positioned within said wall such that said seal seats against said wall surface with one edge abutting the intersection of said first and second surface portions.

4. The reciprocating valve as claimed in claim 3 wherein the angle of inclination of the exposed surface of said seat conforms to the angle of inclination of said first cylindrical surface portion.

5. In a pressure relief valve of the poppet type including an annular wall defining a flow path, a reciprocating valve disc carried within said wall and means for biasing said valve disc in closed position against the pressure of the fluid upstream thereof, the improvement wherein said wall includes at least one surface portion inclined outwardly in the direction of fluid flow, and said reciprocating valve disc is positioned for movement into peripheral contact with said wall surface portion to close said valve and wherein the peripheral edge of said disc is frustoconical in cross section such that said edge and said inclined wall surface portion define a variable venturi flow orifice.

6. The pressure relief valve as claimed in claim 5 wherein said wall further includes a second surface portion also inclined outwardly in the direction of flow, said first inclined surface portion is adapted to contact the upstream contact surface of said frustoconical peripheral edge of said valve when said valve is in fully closed position, and the extension of said plane of contact between said disc surface and said first wall surface portion intersects the longitudinal axis of said valve to form an included angle of approximately 30° to 60° and said second wall surface portion extends downstream and is interconnected with said first surface portion, with the extension of said second surface portion intersecting the longitudinal axis of said valve to form an included angle of approximately 15° to 25°.

7. The pressure relief valve as claimed in claim 6 wherein the upstream surface of the peripheral edge of said disc is defined by a resilient seat to prevent leakage between said disc valve and said wall when said valve is in closed position.

* * * * *